UNITED STATES PATENT OFFICE.

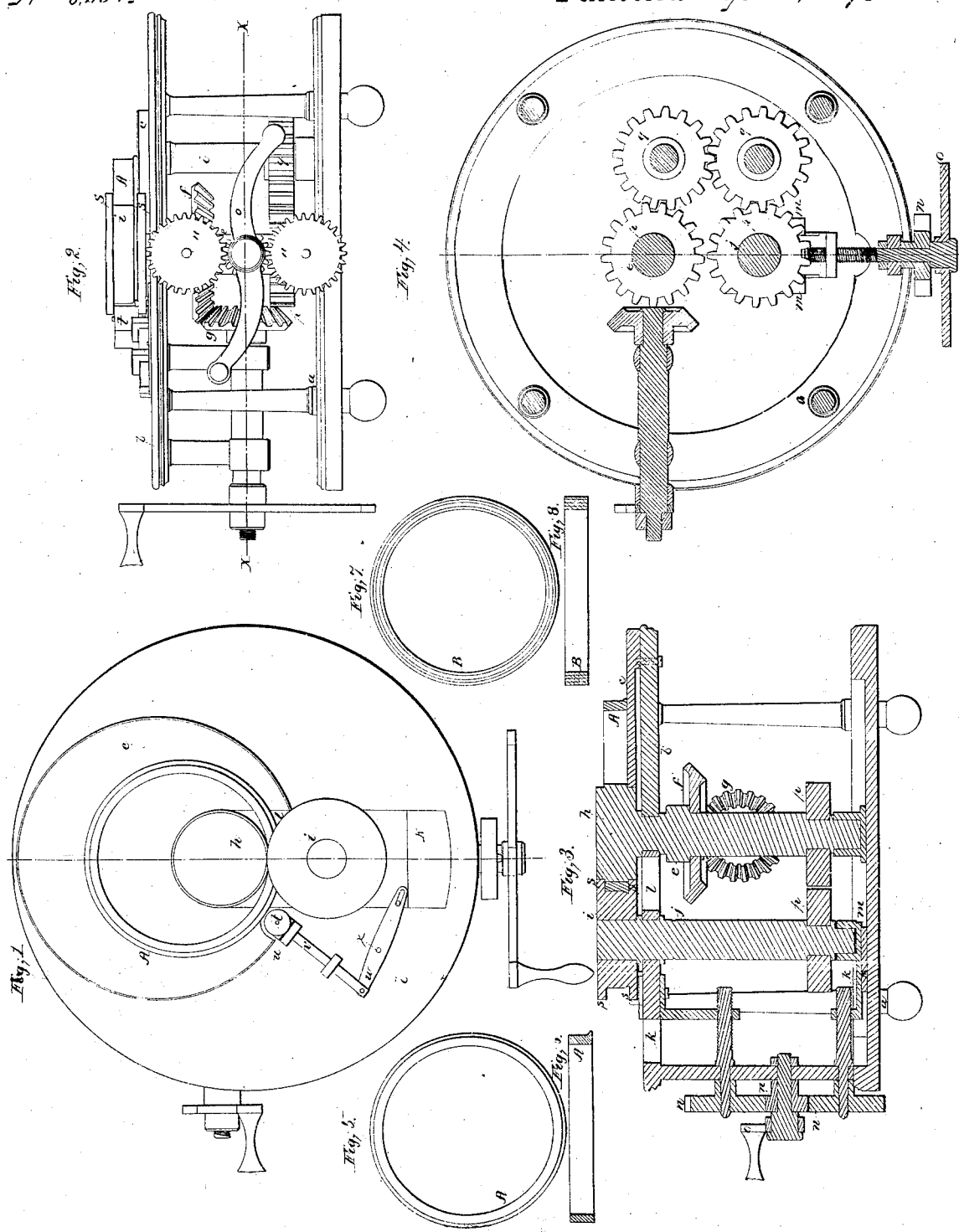

THOMAS W. ALLEN AND CHARLES W. NOYES, OF GREENBUSH, NEW YORK.

IMPROVEMENT IN MACHINERY FOR MAKING IRON WHEELS.

Specification forming part of Letters Patent No. 6,254, dated April 3, 1849.

*To all whom it may concern:*

Be it known that we, THOMAS W. ALLEN and CHARLES W. NOYES, of Greenbush, in the county of Rensselaer and State of New York, have invented new and useful Improvements in the Method of and Machinery for the Making of Iron Tires for Railroad and other Wheels; and we do hereby declare that the following is a full, clear, and exact description of the principle or character which distinguishes them from all other things before known, and of the manner of making, constructing, and using the same, reference being had to the accompanying drawings, making part of this specification, in which—

Figure 1 is a plan; Fig. 2, a front elevation; Fig. 3, a vertical section; and Fig. 4, a horizontal section taken at the line X X of Fig. 2; and Figs. 5, 6, 7, and 8 are plans and vertical sections of the tire formed and the fagoted hoop preparatory to rolling.

The same letters indicate like parts in all the figures.

The making of tires of railroad-wheels has heretofore been attended with much difficulty and the tires when made have been defective. The mode heretofore and now generally adopted is to fagot or pile a number of small bars and then to roll out a straight bar of the form required, which is then bent into the hoop form and welded. This process is attended with much labor, for the rolling of the bar into a straight line can only be done by a series of rollings which require the bar at each operation to be transferred back from one side to the other by hand, and after the bar has been properly formed it must then by another operation be bent in the hoop form and welded, which welding, being at one part of the circumference alone, renders the tire weak at that point. The object of our invention is to reduce this complex and laborious series of operations to a single operation and at the same time to improve the article produced.

Our invention relates to the method of making the tires of railroad-wheels of wrought-iron fagoted in the form of a hoop by taking a series of thin hoops, each with a lap-joint, and so connecting all the hoops by rivets or otherwise as to have the lap-joints of the series each at different parts of the circle, termed "breaking joints;" and the first part of our invention, which relates to the machine for welding and forming such tires, consists in rolling the tires between two forming, welding, and rolling rotating rollers provided with flanges to embrace the tires to prevent the iron while being drawn or rolled from spreading out at the sides, and thus to form the edges of the hoop or tire at the same time that the iron is rolled out by the pressure of the periphery of the two rollers, the periphery of one of the said rollers being so formed as to give the required form to the periphery of the tire, the said rollers being so combined with machinery as to admit of their being adapted to move from or toward each other with their axes parallel to reduce the tire to the required thickness, and also to admit of inserting the tire between them and taking it out. This part of our invention also consists in combining with the two drawing and forming rollers above specified a third or auxiliary roller which makes pressure on the periphery of the tire as it is being drawn out to insure the giving the proper curvature to the tire when the bearings of the said third roller are connected with the bearings of the second roller, that as the second approaches the first the third shall recede; and, finally, our invention consists in combining with the rollers that draw out and form the tire a face-plate, or the equivalent thereof, on which one edge of the tire rests as it undergoes the drawing operation and by which its proper position is insured.

In the accompanying drawings, Figs. 5 and 6, A represents the tire of a railroad-wheel completed and formed at one operation from a fagoted hoop B, Figs. 7 and 8, the said hoop consisting of a series of thin hoops with lap-joints, the lap-joints of the series being each in a different part of the circle, or, as it is technically termed, "breaking joints." The hoop thus prepared is to be heated in a furnace to a proper welding heat and then submitted to the operation of a rolling-machine such as we shall describe herein, or to any other which may be found to answer the purpose, and by any such operation it is to be welded, drawn out, and properly formed by rolling.

*Of the machine for making tires.*—In Figs.

1, 2, 3, and 4 of the accompanying drawings, $a$ represents a frame adapted to the purpose, but which may be varied at pleasure. To the top plate $b$ of said frame is properly secured a face-plate $c$, on which one edge of the tire A that is being rolled runs during the operation of the machine. A vertical shaft $e$, with appropriate journals, is hung in boxes in the top and bottom plates of the frame, so formed as to insure steadiness during the rotation. Immediately under the top plate the said shaft is provided with a bevel cog-wheel $f$, which engages a corresponding beveled wheel $g$ on a horizontal shaft, by which the required rotary motion is given to the rolling parts of the machine. The upper end of this shaft is provided with a cylindrical roller $h$, of a diameter less than the smallest size of fagoted hoop intended to be worked in the machine and of a thickness equal to the intended width of the tires to be made. The under face of the roller runs in contact with the upper face of the face-plate $c$, that the lower edge of the tire A may bear on the face-plate and be thereby guided during the operation. By the side of the roller $h$, just described, there is another and corresponding roller $i$, also mounted on a corresponding and parallel shaft $j$, which, however, instead of running in fixed boxes, as the other shaft, runs in sliding boxes $k\ k$, that it may be moved toward and from the roller $h$ to admit of inserting and removing the tire, and also to reduce the distance between the said rollers as the tire is being drawn by them. The upper one of these boxes is adapted to slide in a recess $l$ in the top plate of the frame, and this recess is also extended into a part of the face-plate, and the lower box slides in ways $m$ on the bottom plate of the frame. These boxes are made to slide toward and from the axis of the roller $h$ by means of two parallel screws which are tapped into projections on the boxes, and the two screws are geared together by a train of cog-wheels $n$ to insure their turning in the same direction and with equal velocity that the two shafts may always retain their parallelism.

The arbor of the intermediate one of the train of cog-wheels $n$ is provided with a double winch $o$, by means of which the operator can give the required position to the roller $i$. Motion is communicated from the shaft of the roller $h$ to that of the roller $i$ by a train of four cog-wheels $p\ p\ q\ q$, the wheels $p\ p$ being on the shafts of the rollers and the other two on two auxiliary parallel shafts by the side of them. By this means a reversed motion such as required is given to the two rollers, and they can at the same time be separated to the extent required without seriously affecting the meshing of the cogs. The roller $i$ is made with its face the reverse of the form intended to be given to the outer periphery of the tire, including the flange when required, and then on each side it has a projecting flange $s\ s$ to prevent the tire from spreading out at the sides and to give finish required thereto. These flanges a such projection as to embrace in part th riphery of the roller $h$ during the operation, which has the effect in part to prevent the iron from forming a feather or fin on each side; but in addition to this it will be found advantageous in forming the fagoted hoop to bevel the edges of the inner hoop of the fagot. By the side of the roller $i$, and parallel therewith, there is a third roller $t$, of less diameter, with its periphery made in manner similar to that of the roller $i$, but without flanges. It runs on a stud-pin $u$ on a radial slide $v$, connected with the upper sliding box of the roller $i$ by an intermediate lever $w$, that turns on a fulcrum-pin $x$. The object of this additional roller $t$ is to insure the giving the required circle to the tire, and its slide being connected with the sliding box of the roller $i$ it follows that as the roller $i$ approaches the roller $h$ to roll out the iron, and thereby increase the diameter of the tire, the roller $t$ recedes from the roller $h$, and is thus adapted to the enlarging diameter of the tire.

The fulcrum of the connecting-lever may be made to slide endwise, or else the connection of the lever with either of the slides may be made adjustable to adapt this part of the machine to the making of tires of various sizes; but when the machine is constructed for the making of tires of one size this mode of adjustment is not necessary.

The relative motions of the rollers $h$ and $i$ should be carefully attended to. If their shafts rotate with equal velocity, the diameter of the roller $i$ should be greater than that of the roller $h$ in the proportion of the difference between the outer and inner peripheries of the tire when finished, or nearly in that proportion, or, instead, the rollers may be of the same size and the motion of one greater than the other.

We have thus described the construction of the machine invented by us for welding and rolling tires; but we do not wish to confine ourselves to the precise details herein given, as in many particulars these may be varied without changing the principle of this part of our invention—as, for instance, we have specified that the roller $i$ is made with two flanges and the one $h$ without; but this may be varied by either putting the two said flanges on the roller $h$ or one on each of the rollers; and so of the sliding of the roller $i$ toward the roller $h$ by means of two parallel screws, it will be obvious to any one versed in mechanics that there are other equivalent modes of effecting this end which may be substituted for the two parallel screws—such as two wedges operated by one screw or two cams operating on the two sliding boxes, or the two boxes can be connected together in one sliding frame operated by a single screw, wedge, lever, or cam; and so of the mode of arranging the gearing which communicates motion from the shaft of one of the rollers to the other any other efficient mode of giving these motions may be substituted without varying the principle of our invention; and, if desired, in this part to insure the proper meshing of the cogs of the wheel on the shaft of the roller $i$ with those of the corresponding wheel on the auxiliary shaft the sliding boxes may be made to slide in a segment of a circle of which the center is the axis of the auxiliary shaft; and, finally, instead of the face-plate a series of radial friction-rollers may be substituted, but in our judgment the face-plate will be found the best in practice.

We are aware that it has been attempted to roll tires for railroad-wheels by means of three rollers overhanging a frame and mounted in the manner of rollers for rolling iron, but without success, as such an arrangement without improvements could not effect the purpose; and we are also aware that a machine has been made for rolling hoop-bands by means of two rollers that overhang the frame and made to move toward and from each other at the end that overhangs the frame, a movable face-plate being used to slide up to the edge of the band after it has been put on for the purpose of guiding it; but such a machine could not answer the purpose contemplated by us, and therefore

What we claim as our invention, and desire to secure by Letters Patent, is—

1. The combination of the drawing out and forming rollers mounted on the vertical shafts, so geared and arranged that one can be moved toward and from the other when this is combined with the bed-plate for guiding and keeping the edge of the tire true, substantially as described.

2. In combination with the drawing out and forming rollers, the employment of the auxiliary roller for determining the circle of the tire to be formed, substantially as described, when the said auxiliary roller is so connected with slide of the movable forming-roller that the auxiliary roller may be adapted to the increasing diameter of the tire as it is being drawn out, as described.

THOMAS W. ALLEN.
CHAS. W. NOYES.

Witnesses:
H. Q. LANSING,
GILBERT L. WILSON.